United States Patent
Vokaliga et al.

(10) Patent No.: US 11,966,767 B2
(45) Date of Patent: Apr. 23, 2024

(54) ENABLING DIAL HOME SERVICE REQUESTS FROM AN APPLICATION EXECUTING IN AN EMBEDDED ENVIRONMENT

(71) Applicant: EMC IP HOLDING COMPANY LLC, Hopkinton, MA (US)

(72) Inventors: Deepak Vokaliga, Hopkinton, MA (US); William Hatstat, Spencer, MA (US); Gopalakrishna Manjunatha, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 455 days.

(21) Appl. No.: 17/082,542

(22) Filed: Oct. 28, 2020

(65) Prior Publication Data

US 2022/0129291 A1 Apr. 28, 2022

(51) Int. Cl.
*G06F 9/455* (2018.01)
*G06F 9/54* (2006.01)

(52) U.S. Cl.
CPC .......... *G06F 9/45558* (2013.01); *G06F 9/544* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 8,949,669 | B1* | 2/2015 | Khokhar | G06F 11/0727 714/48 |
| 2008/0244324 | A1* | 10/2008 | Schmelter | G06F 11/0769 714/38.14 |
| 2008/0270674 | A1* | 10/2008 | Ginzton | G06F 9/45533 711/6 |
| 2012/0154375 | A1* | 6/2012 | Zhang | G06F 9/4411 345/522 |
| 2014/0115575 | A1* | 4/2014 | Chand | G06F 9/45558 718/1 |
| 2017/0134788 | A1* | 5/2017 | Lee | G06F 9/45558 |
| 2020/0241913 | A1* | 7/2020 | Do | G06F 8/60 |
| 2021/0034548 | A1* | 2/2021 | Jesionowski | G06F 3/0673 |
| 2022/0100599 | A1* | 3/2022 | Abuelela | H04L 41/5019 |
| 2022/0100645 | A1* | 3/2022 | Paterson-Jones | G06F 9/45558 |

\* cited by examiner

*Primary Examiner* — Umut Onat
(74) *Attorney, Agent, or Firm* — Anderson Gorecki LLP (57) ABSTRACT

A system application, such as a cloud tethering subsystem, is instantiated to execute in an embedded environment of a storage system. Errors of the system application that require external support such as memory overflows, daemon errors, etc., are collected and posted using an error reporting system call to an operating system of the storage system in which the virtualized environment is executing. The storage system operating system posts the errors to an error system reporting system as a dial home service request on behalf of the system application. In this manner, the system application can issue dial home service requests without having direct access to the external error resolution system. In some embodiments, a guest operating system utility uses a SCSI mechanism to post errors to the storage system operating system.

20 Claims, 7 Drawing Sheets

FIG. 5
Read back

FIG. 6

Gosconfig API

```
-gos_container_id CONTAINER-ID
-gos_type GOS-TYPE
-gos_configuration_name CONFIGURATION-NAME
-gos_ipv4_net_addr IPV4-ADDRESS
-gos_ipv4_net_mask IPV4-NETMASK
-gos_ipv6_net_addr IPV6-ADDRESS
-gos_ipv6_net_mask IPV6-NETMASK
-gos_ip_net_reset
-dbg
-dbg_log
-error_id
-severity
-error_desc
-error_spec
-error_spec_file
-post_error
```

FIG. 7

Syscall Parameter and Structure Format

```
/****************************** 923D_90 ******************************/
/* Guest error logging                                                */
/* syscall_parms :                                                    */
/*   start - 0                                                        */
/*   count - number of parms records                                  */
/*   parm1 - App type, see E_SYSC_923D_90_00_APP_TYPE                 */
/* syscall_notes:                                                     */
/*                                                                    */ define SYSC_923D_90_00_MAX_SPEC_BUFF_LENGTH   0x1000 /* FMT3 max length */ typedef enum
{
  SYSC_923D_90_00_APP_UNKNOWN,
  SYSC_923D_90_00_APP_CLOUD    /* Will log CA.DECA.xx or CA.DECB.xx depending upon severity */
} E_SYSC_923D_90_00_APP_TYPE;

/* So far only sev-2 and sev-3 are supported. */
typedef enum
{
  E_SYSC_923D_90_00_ERR_SEVERITY_HIGH   = 2,
  E_SYSC_923D_90_00_ERR_SEVERITY_MEDIUM = 3
} E_SYSC_923D_90_00_ERR_SEVERITY;

typedef struct
{
  UINT32 error_severity;     /* E_SYSC_923D_90_00_ERR_SEVERITY */
  UCHAR  error_modifier;
  UCHAR  pad[3];
  UCHAR  error_spec_buff[SYSC_923D_90_00_MAX_SPEC_BUFF_LENGTH];
} T_SYSC_923D_90_00_PARMS;
```

ENABLING DIAL HOME SERVICE REQUESTS FROM AN APPLICATION EXECUTING IN AN EMBEDDED ENVIRONMENT

FIELD

This disclosure relates to computing systems and related devices and methods, and, more particularly, to a method and apparatus for enabling dial home service requests from an application executing in an embedded environment.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A system application, such as a cloud tethering subsystem, is instantiated to execute in an embedded environment of a storage system. Errors of the system application that require external support such as memory overflows, daemon errors, etc., are collected and posted using an error reporting system call to an operating system of the storage system in which the virtualized environment is executing. The storage system operating system posts the errors to an error system reporting system as a dial home service request on behalf of the system application. In this manner, the system application can issue dial home service requests without having direct access to the external error reporting system. In some embodiments, a guest operating system utility uses a SCSI mechanism to post errors to the storage system operating system.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
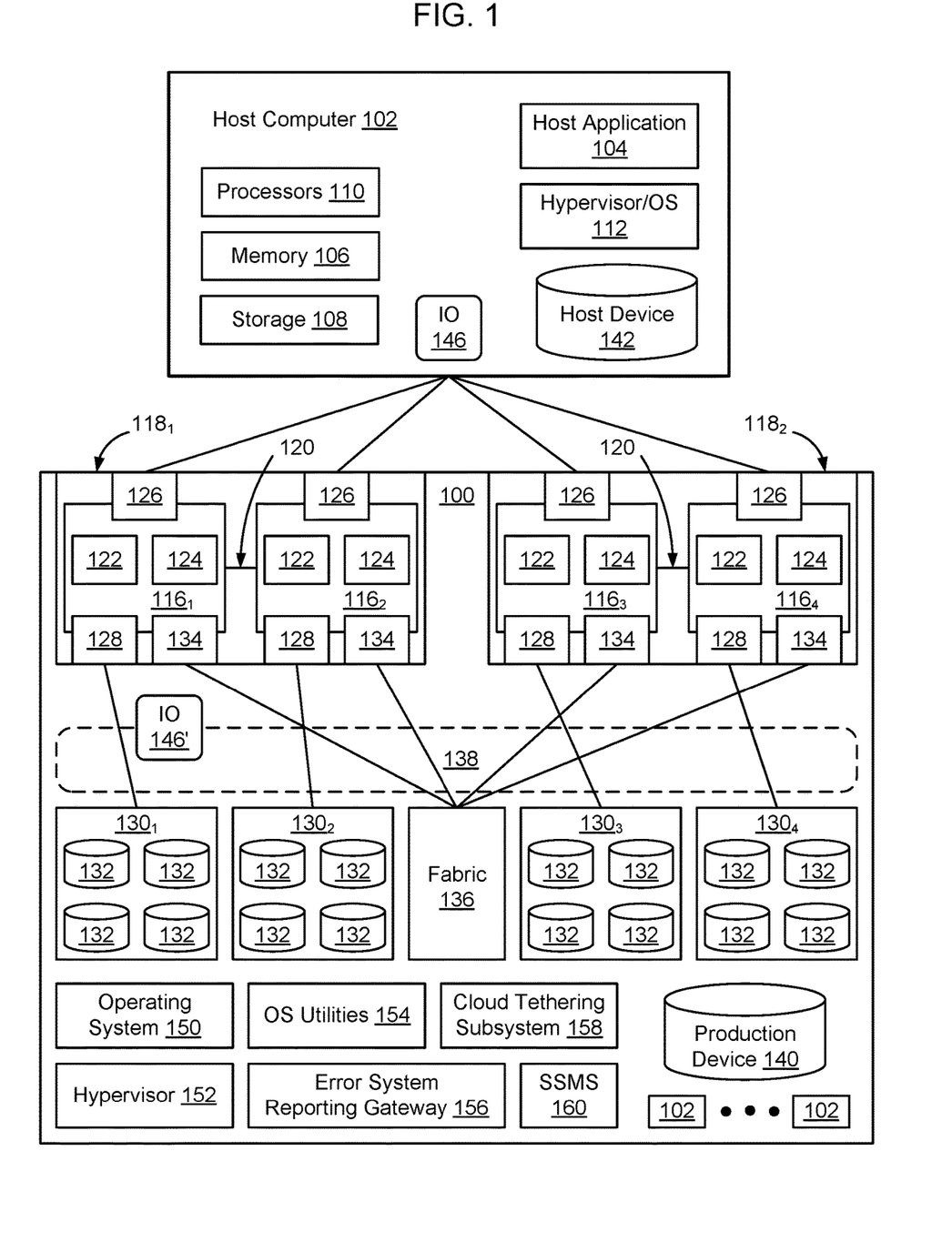
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front-end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140 (zoning).

Not all volumes of data on the storage system are accessible to host computer 104. When a volume of data is to be made available to the host computer, a logical storage volume, also referred to herein as a TDev (Thin Device) or LUN, is linked to the volume of data, and presented to the host computer 102 as a host device 142. For example, to protect the production device 140 against loss of data, a snapshot (point in time) copy of the production device 140 may be created and maintained by the storage system 100. If the host computer 102 needs to obtain access to the snapshot copy, for example for data recovery, the snapshot copy may be linked to a logical storage volume (TDev) and presented to the host computer 102 as a host device 142. The host computer 102 can then execute read/write IOs on the TDev to access the data of the snapshot copy.

As shown in FIG. 1, in some embodiments the storage system 100 has an operating system 150, a hypervisor 152, operating system utilities 154, a error system reporting gateway 156, and a cloud tethering subsystem 158. Each of these components is described in greater detail below.

In some embodiments, storage system operating system 150 is an embedded operating system of the storage system 100. An example storage system operating system 150 may be based on Linux, although other operating systems may also be used. In some embodiments, the storage system operating system has an operating system utility 154 configured to receive and process system calls (syscalls). Utility 154 will also be referred to herein as syscall code. As discussed in greater detail, in some embodiments the syscall code 154 of the storage system operating system 150 is configured to receive system calls (syscalls) from applications executing in embedded environments on the storage system 100. The storage system also has a storage system error reporting subsystem 155 that is used to post errors of the storage system, and errors received via syscalls from the embedded environments to an error system reporting gateway 156.

As shown in FIG. 1, the storage system 120 has physical resources such as CPUs 122, local memory 138, storage resources 132, and other physical resources. The hypervisor 152 abstracts the physical resources of the storage system 100 from emulations (virtual machines), and allocates physical resources of storage system 100 for use by the emulations. In some embodiments, the hypervisor 152 enables creation of embedded environments on the storage system 100, such that each embedded environment is implemented as a container having a guest operating system 202 and one or more applications executing in the context of the guest operating system 202.

Figure 2:
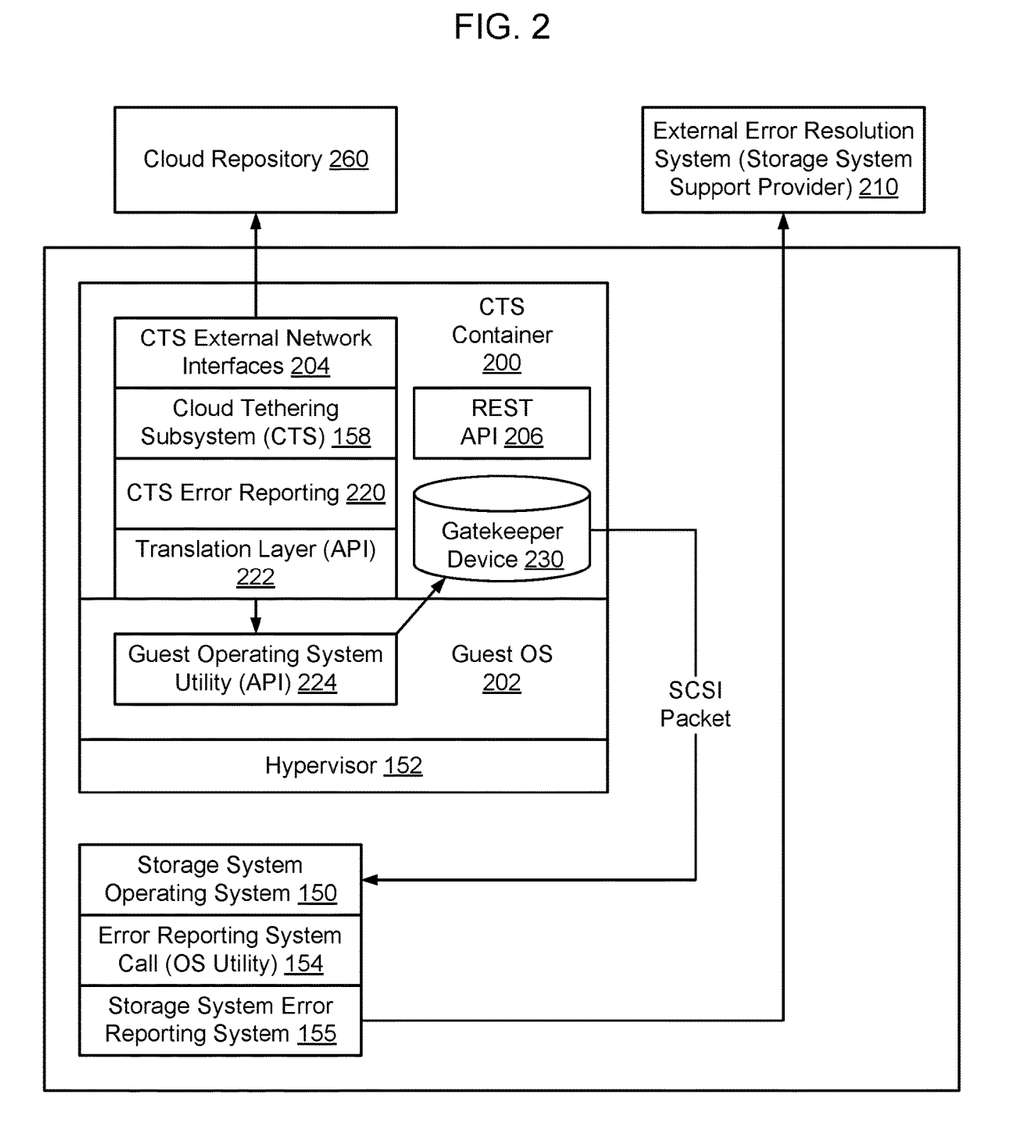
FIG. 2 is a functional block diagram of a storage system showing a cloud tethering subsystem instantiated to execute in an embedded environment, according to some embodiments.

FIG. 2 is a functional block diagram of a storage system showing a cloud tethering subsystem instantiated to execute in an embedded environment, according to some embodiments. As shown in FIG. 2, the cloud tethering subsystem container 200 includes a guest operating system 202, and the cloud tethering subsystem application 158 executes in the context of the guest operating system 202. The cloud tethering subsystem container 200 is an embedded environment in the storage system 100 and is abstracted from the storage system operating system 150 by hypervisor 152.

The cloud tethering subsystem 158 is responsible for creating cloud providers on a cloud repository 260 and managing transmission of snapshots and other volumes of data from the storage system 100 to the cloud repository 260 over network interfaces 204. Snapshots are point in time copies of data. For example, a snapshot of a production device 140 is a copy of the data of the production device as the data existed at a particular point in time. Because snapshots consume storage resources of the storage system 100, there are circumstances where it may be desirable to move at least some of the snapshots from the storage system 100 to a cloud repository 260, for example to free up space in the back-end drive arrays 130, or for many other reasons.

In some embodiments, the cloud tethering subsystem 158 includes external network interfaces 204 that enable the cloud tethering subsystem 158 to communicate with external cloud repositories 260. A given storage system may have multiple instances of cloud tethering subsystem 158 instantiated thereon. A given cloud tethering subsystem 158 may have multiple cloud providers that it uses to store snapshots of different storage groups. Example cloud service providers, that are configured to implement cloud repositories 260, include ECS (Elastic Cloud Storage)™, Amazon S3™, Google Cloud™' and Microsoft Azure™, although any number of cloud providers might be used.

The cloud tethering subsystem may also include one or more internal interfaces, such as a REST API 206 that is used to enable a user to configure operation of the cloud tethering subsystem 158. For example, a user may want to create new cloud providers on the cloud repositories, or select one or more snapshots to be shipped to the cloud. All of these operations typically are implemented by having the user interact with a storage system management application 160, that in turn instructs the cloud tethering subsystem 158 (via the REST API 206) to take particular actions.

As shown in FIG. 2, the storage system 100 includes an error system reporting system 155 that is used to generate dial-home service requests to an external error resolution system 210. The external error resolution system 210 is generally associated with the company that supplied the storage system to the user. When the storage system experiences an error, such as an operating system failure or system component failure, the error system reporting system 155 is used to generate and transmit the dial-home error. Technical support at the external error resolution system 210 can then take remedial action on the storage system 100 to correct the error associated with the report. In this manner, technical support can be automated such that the storage system 100 automatically reports errors to the storage system support provider.

Unfortunately, some applications implemented in embedded environments on the storage system do not have an interface to the external error resolution system 210. One example system application, that lacks the ability to communicate directly with the external error resolution system 210, is the cloud tethering subsystem application 158. While the cloud tethering subsystem 158 does have external network interfaces 204, those interfaces 204 are configured to communicate with the cloud repositories 260 and are not connected to the external error resolution system 210. Likewise, as noted above, the cloud tethering subsystem 158 has a REST API 206 that enables the cloud tethering subsystem 158 to communicate with a storage system management application 160. Unfortunately, the storage system management application 160 is not configured to handle system errors, and accordingly, the cloud tethering subsystem 158 is not able to use its REST API to generate dial home service requests on the integrated dial-home service request facility implemented by the error system reporting system 155.

The cloud tethering subsystem 158 thus has no external interface which is able to directly connect to the external error resolution system 210. Since the external error resolution system 210 is the system that is configured to request customer support for the storage system 100, communicating any errors associated with the cloud tethering subsystem is critical for customer support. Additionally, since the cloud tethering subsystem is the system application configured to communicate with the cloud repository 260, a failure of the cloud tethering subsystem can prevent the storage system from accessing cloud resources.

In some embodiments, as discussed in greater detail below, a guest operating system utility 224 of a guest operating system 202 in container 200 is configured to enable an application executing in an embedded environment (container 200) to generate and post errors as system calls (syscalls) to the storage system operating system 150. The storage system operating system 150 processes the syscalls and posts the errors to the error system reporting system 155 for transmission to the external error resolution system 210. In this manner, errors associated with applications executing in embedded environments on the storage system 100 are able to post errors to the external error resolution system 210.

According to some embodiments, embedded containerized services such as the cloud reporting subsystem 158 posts critical and medium severity dial home errors into the storage system operating system 150, and the storage system operating system 150 uses the error system reporting system 155 to generate and transmit dial-home service requests to the external error resolution system 210. Although an example application executing in an embedded environment will be described in connection with a cloud tethering subsystem 158, other applications that lack the ability to directly post errors to the external error resolution system 210 may use similar mechanisms to post errors to the storage system operating system 150.

In some embodiments, the cloud tethering subsystem 158 has a cloud tethering subsystem error reporting system 220 configured to collect errors and periodically send the errors to the storage system operating system 150. The cloud tethering subsystem 158 internally maintains a table of all possible dial-home errors used by the storage system operating system 150. When an error is detected, the type of error is detected by the CTS error reporting subsystem 220. The type of error is then used to select an error code for the error from the table of possible dial-home errors. The error is then added to a list of errors to be reported to the storage system operating system 150.

When the error reporting system 220 has an error or a group of errors, the error reporting system 220 passes the error to a translation layer API 222 that posts the error to guest operating system utility 224. Guest operating system utility 224 will also be referred to herein as GOSconfig 224.

In some embodiments, GOSconfig 224 is an API implemented as multi-run system call (syscall) interface. The syscall, in this instance, is an error reporting syscall. The syscall is referred to as "multi-run" because it is able to consolidate multiple errors into a single syscall. The syscall interface is also able to accommodate variable length parameters. Table I shows an example set of syscall parameters.

TABLE I

| Error Category | Error Severity | Error Message | Error Information |
|---|---|---|---|
| 001-256 | 1 = High Severity 2 = Medium Severity | One-line description of the error | 0x50 Byte error buffer - passed in via a file |

In some embodiments, high severity dial-home errors are those errors that require immediate attention. Medium severity dial-home errors are errors that go on a service request queue and are not as urgent as those that require immediate attention.

In some embodiments, the translation layer API 222 is implemented using the following format: REST URI, REST Method, Error Category, Error Severity, Error Message, Error Description. For example, the following API may be used to implement the translation layer API 222. Of course, other APIs may be used to implement the translation layer API 222 depending on the implementation.

/usr/concierge/concierge_t000 callHomeForCloud $errID $severity $errSpec #errDesc Of course, other APIs may be used to implement the translation layer API 222 depending on the implementation.

Figure 6:
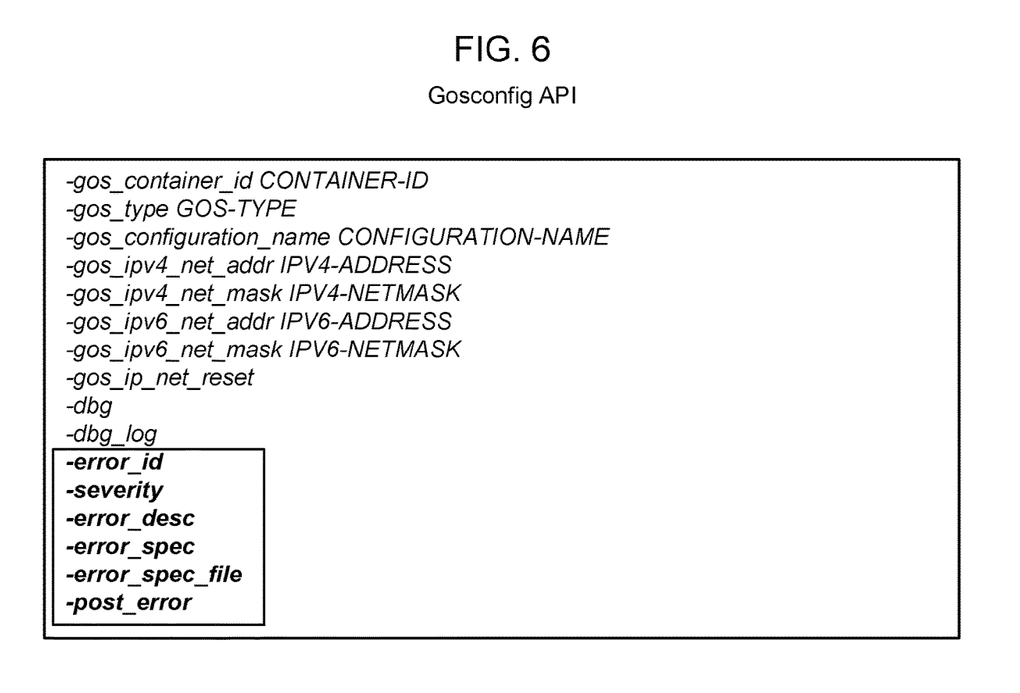
FIG. 6 is an example guest operating system configuration utility API (Gosconfig API), according to some embodiments.

FIG. 6 shows an example GOSconfig API 224. As shown in FIG. 6, the GOSconfig API 224 include the ability to specify the error ID, error severity, error description, and error specification using either a command line or file, and post the error, which are highlighted in FIG. 6.

Mechanics of Posting Error to the Storage System Operating System

GOSconfig 224 is a utility on the guest operating system 202. The guest operating system 202 runs in an emulation on the storage system 100. GOSconfig 224 provides options for the cloud tethering subsystem guest operating system 202 to post any critical errors, and details of such errors, observed during operation of the cloud tethering subsystem 158 in container 200. Any errors posted by GOSconfig 224 are posted to the storage system operating system 150 for reporting, for any processing/decision making and call home purposes.

In some embodiments, GOSconfig 224 is configured to enable the cloud tethering subsystem guest operating system 202 to post error messages to the storage system operating system 150. In some embodiments, GOSconfig 224 is restricted only to allow CTS guests to post error messages using application ID. These messages will be issued for call home purpose. The storage system operating system 150 will use this information to issue call home messages through the storage system error reporting system 155 to the external error resolution system 210.

In some embodiments, a GOSconfig 224 "Post_Error" operation is used to communicate an error from the guest operating system 202 to the storage system operating system 150. The Post_Error operation includes several parameters, including an error category (e.g. error ID between 0x00 to 0xFF), the error severity (e.g. high or medium), an error description (e.g. a one-line error description of up to 4094 bytes), and an error specification (e.g. a specification of the error having a maximum length of 255 bytes). Although a particular implementation of a GOSconfig Post_Error operation has been described, other formats may be used as well depending on the implementation.

In some embodiments, the GOSconfig Post_Error operation provides an option to pass the error specification either through a command line or through a file. In some embodiments, the option "err_spec" will be provided to pass the error specification through a command line and the option "err_spec_file" will be provided to read and post error specification from the given file. The following Table II shows an example GOSconfig 224 operation and associated parameters.

TABLE II gosconfig -err_id <error number - 00-0xFF> -severity <High/Medium>
  -err_desc <error description>
  < [ -err_spec <error specification> ] | [ -err_spec_file <error specification file name> ] >
    post_error Table III shows an example use case, with the error ID and other parameters being used for illustration purposes only.

TABLE III

Pass specification through command line:
gosconfig -err_id 0x01 -severity High err_desc "high severity error" -err_spec "call home" post_error
Pass specification through file name:
gosconfig -err_id 0x01 -severity High err_desc "high severity error" -err_spec_file "/tmp/error_spec_file.txt" post_error GOSconfig 224 gathers the above information from the cloud tethering subsystem guest operating system 202 and forms a syscall packet. In some embodiments, the syscall packet is implemented as a SCSI (Small Computer System Interface) CDB (Command Descriptor Block). In some embodiments, the guest operating system 202 uses syscall 923D_90 to pack the above-mentioned information and pass it to the storage system, although the particular syscall used will depend on the particular syscall ID provided by the storage system operating system 150, which will depend on the particular implementation.

Figure 7:
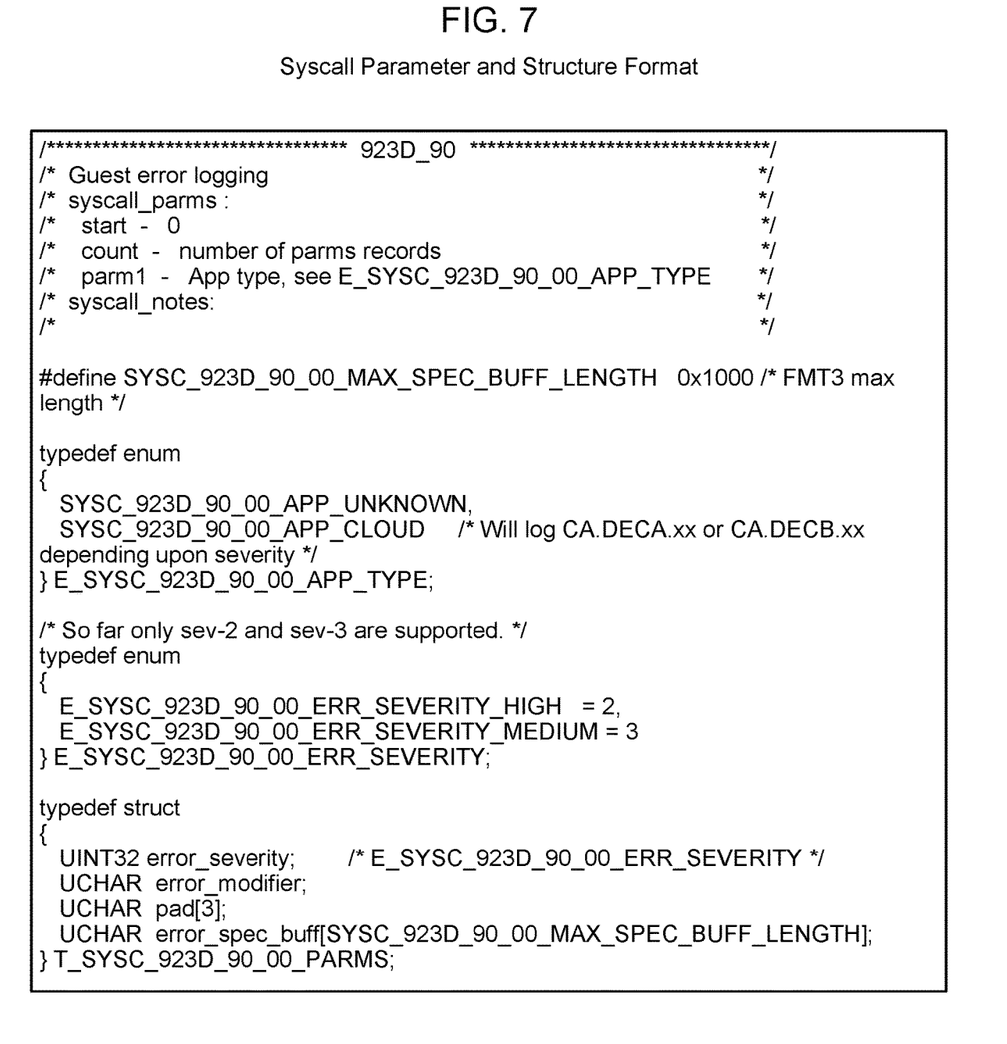
FIG. 7 is an example system call that may be used in connection with enabling dial home service requests from containers virtualized in an embedded environment, according to some embodiments.

FIG. 7 shows an example syscall parameter and structure format. Other formats can be used depending on the implementation.

GOSconfig 224 processes information from the cloud tethering subsystem application 158 and forms the syscall packet in the format shown in FIG. 7. The storage system operating system 150, on which the cloud tethering subsystem emulation is running, creates gatekeeper (GK) devices and maps one or more gatekeeper devices (LUNs) 230 to the guest operating system 202 in the cloud tethering subsystem container 200. The guest operating system utility 224, GOSconfig 224, when called by the cloud tethering subsystem application 158 on the guest operating system 202, selects one of those available gatekeeper devices 230 and opens the device for writing. GOSconfig 224 forms a SCSI write packet (command descriptor block) having above mentioned syscall information and sends the syscall data over the gatekeeper device 230 to the storage system operating system 150.

Once the syscall reaches storage system 100 receives the syscall through the gatekeeper device 230, the error information is extracted by guest operating system utility 154 (syscall code) and passed to the storage system error reporting system 155. The storage system error reporting system 155 transmits the error information to the external error resolution system 210. The success or failure of any "Post_Error" operation is returned by the storage system to the cloud tethering subsystem as a response to the syscall through the same gatekeeper device 230 as a SCSI packet. GOSconfig 224 processes the return value and notifies the cloud tethering subsystem 158 of the success or failure of the "Post_Error" operation. Optionally, the cloud tethering subsystem application 158 may notify the storage system management application 160 of the success or failure of the "post_error" operation on the REST API.

Figure 3:
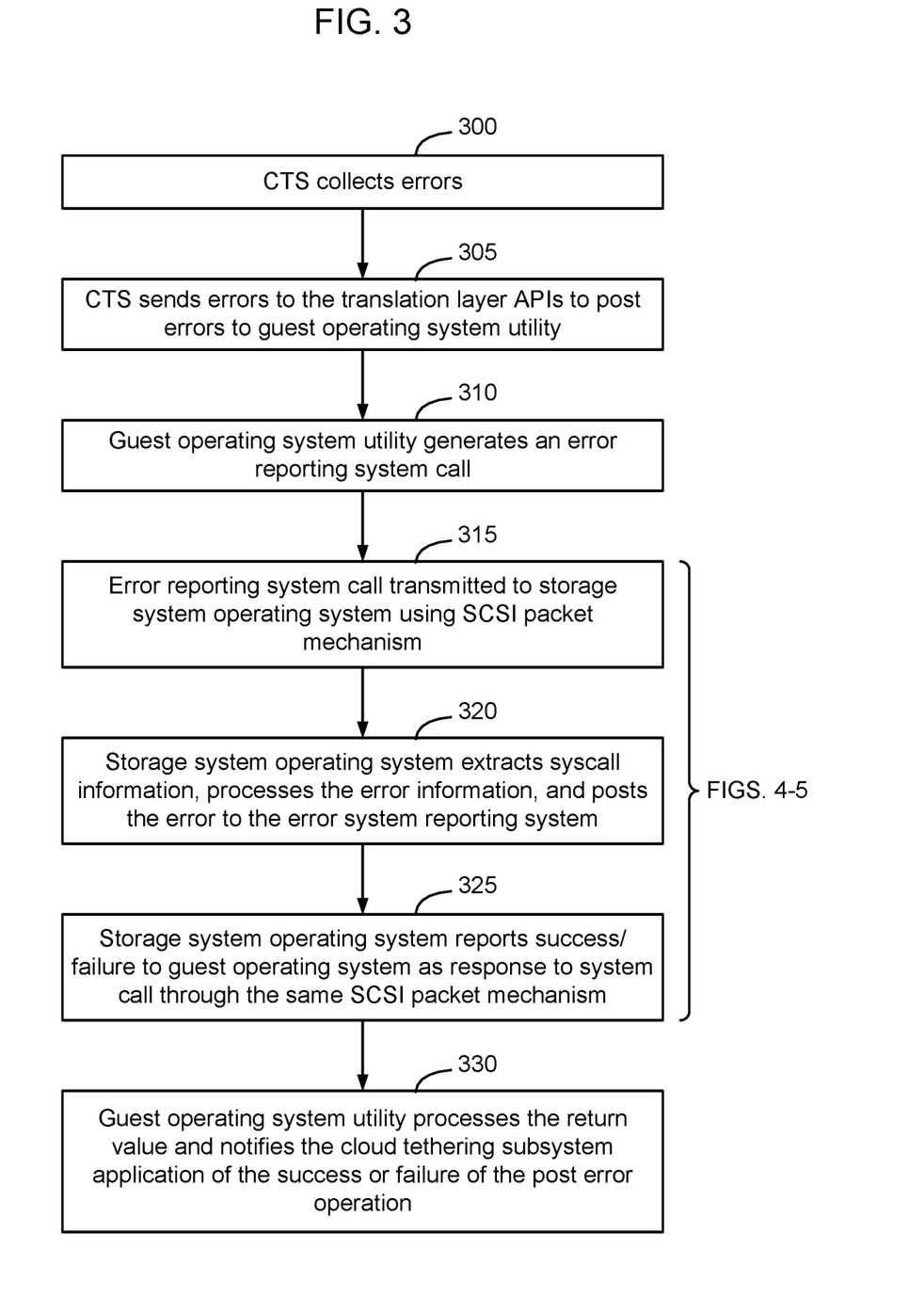
FIG. 3 is a flow chart of an example method of enabling dial home service requests from an application instantiated to execute in an embedded environment, according to some embodiments.

FIG. 3 is a flow chart of an example method of enabling dial home service request from an application instantiated to execute in an embedded environment, according to some embodiments. Although this method will be described in connection with a cloud tethering subsystem operating in an emulation in an embedded environment, the method shown in FIG. 3 may be used in connection with other applications executing in embedded environments.

As shown in FIG. 3, the command tethering subsystem application 158 collects errors to be transmitted to the external error resolution system (block 300). The cloud tethering subsystem application 158 sends the errors to the translation layer API 222 to post the errors to guest operating system utility GOSconfig 224 (block 305). The guest operating system utility GOSconfig 224 generates an error reporting system call (block 310). The error reporting system call is transmitted to the storage system operating system 150 using a SCSI packet mechanism (block 315). An example SCSI packet mechanism is described in greater detail in connection with FIGS. 4 and 5.

The error reporting syscall utility 154 of the storage system operating system 150 extracts the syscall information, processes the error information, and posts the error to the error system reporting system 155 (block 320). The storage system operating system 150 then reports the success/failure to the guest operating system 202 as a response to the system call, through the same SCSI packet mechanism (block 325). The guest operating system utility GOSconfig 224 processes the return value and notifies the cloud tethering subsystem application 158 of the success or failure of the Post_Error operation (block 330).

By configuring a GOSconfig 224 in a guest operating system 202 of an embedded container 200 with the ability to generate Post_Error syscalls on the underlying storage system operating system 150, it is possible to enable an application executing in an embedded environment to communicate with an external error resolution system, even though the application executing in the embedded environment has no native ability to directly communicate with the external error resolution system 210. This enhances the reliability of applications executing in embedded environments, by ensuring that errors associated with operation of the applications, or other errors associated with the containers in which the applications are executing, are able to be reported to the external error resolution system 210.

Figure 4:
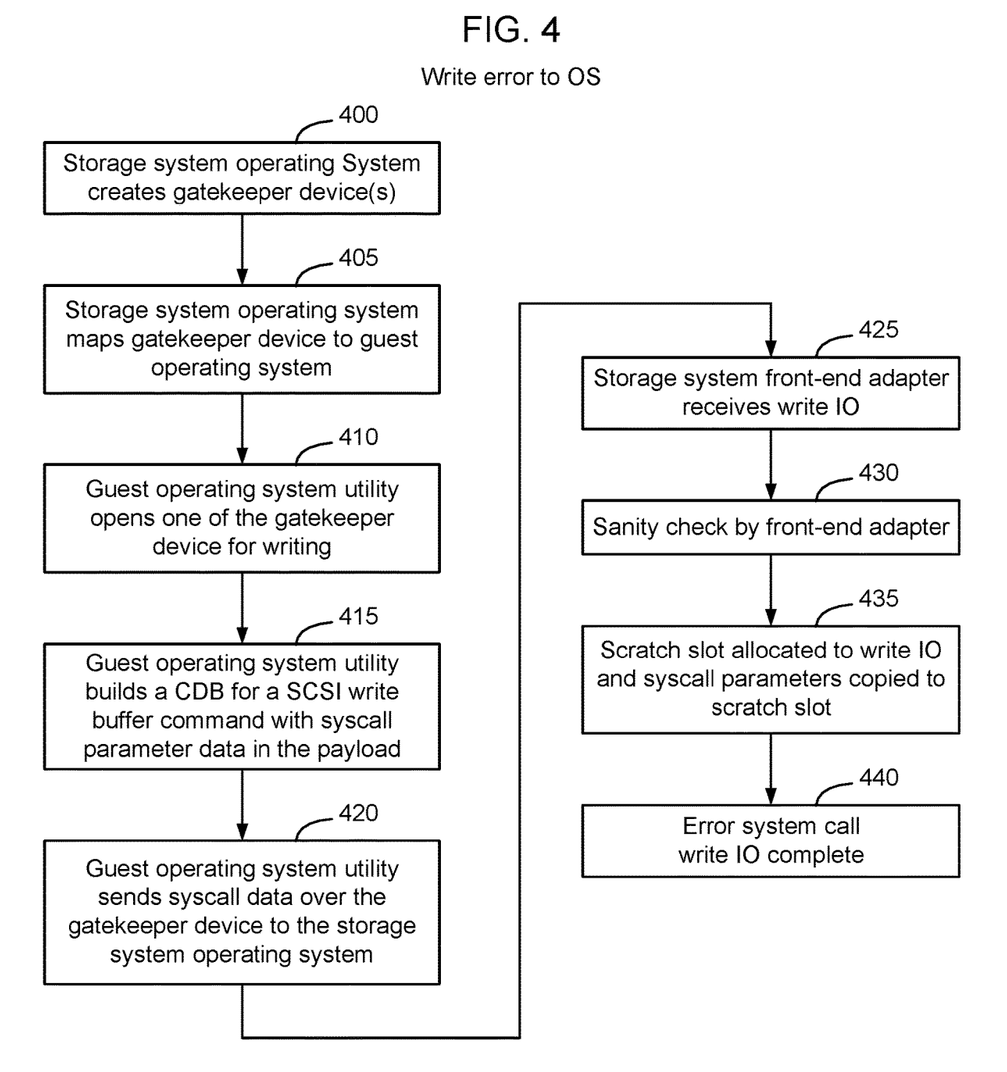
FIG. 4 is a flow chart of an example method of implementing a write IO operation associated with implementing a dial home service request from an application instantiated to execute in an embedded environment, according to some embodiments.
Figure 5:
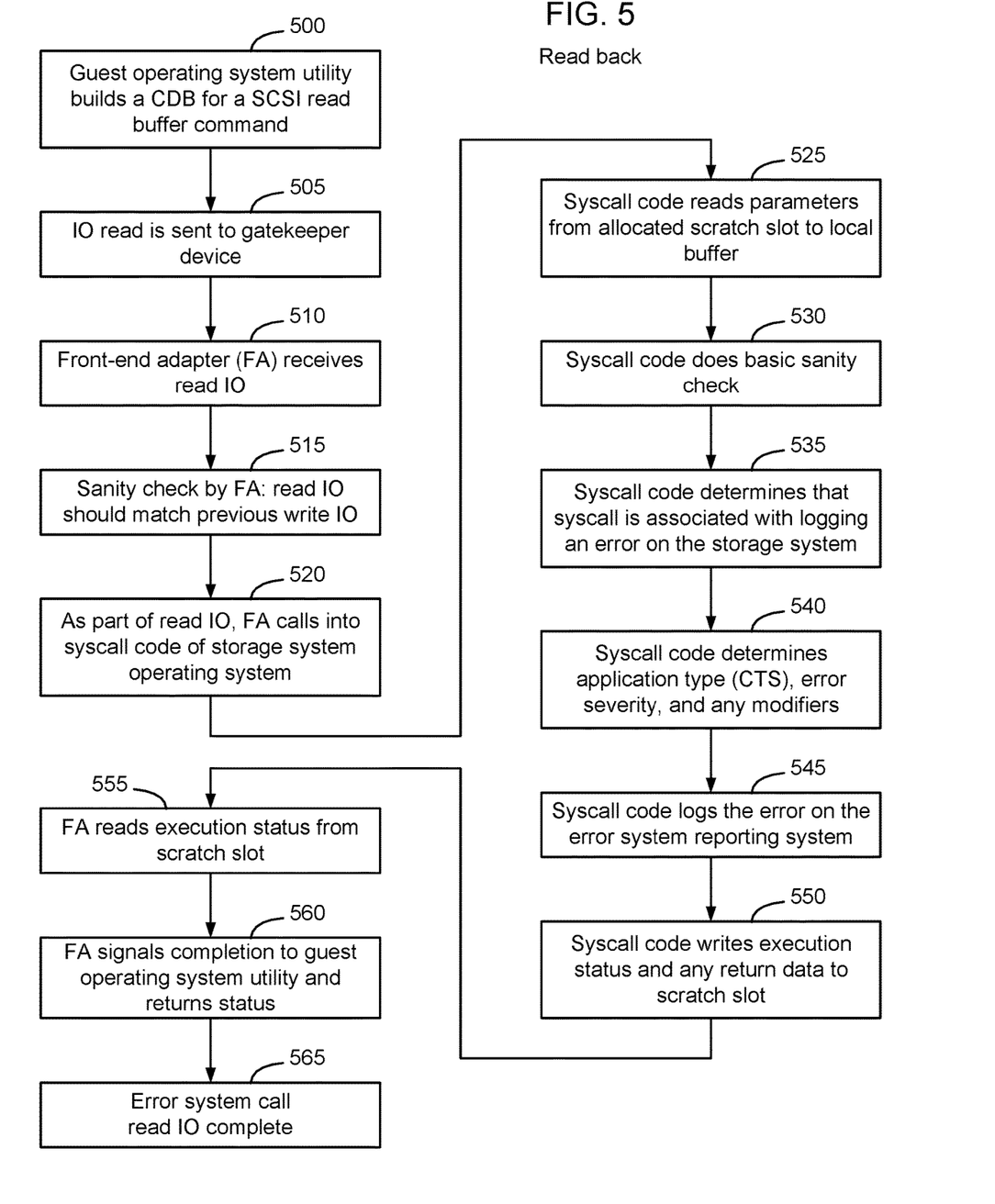
FIG. 5 is a flow chart of an example method of implementing a read IO operation associated with implementing a dial home service request from an application instantiated to execute in an embedded environment, according to some embodiments.

FIGS. 4 and 5 are flow charts of an example method of implementing write and read IO operations associated with implementing a dial home service request from an application instantiated to execute in an embedded environment, according to some embodiments. Specifically, FIG. 4 shows operations associated with writing a post_error message and FIG. 5 shows operations associated with a read back operation of the post_error message.

As shown in FIG. 4, initially the storage system operating system 150 creates one or more gatekeeper devices 230 (block 400). To access the gatekeeper device 230 (TDev), the gatekeeper device is mapped to the guest operating system 202 (block 405) such that guest operating system 202 of the cloud tethering subsystem container 200 can execute read and write IOs on the gatekeeper device 230. As shown in FIG. 1, in some embodiments the gatekeeper device 230 is implemented as a host device 142, which is associated with a respective production device 140 on the storage system 100. When the guest operating system 202 issues read and write operations on the gatekeeper device 230, those IO operations will appear as read and write operations on the front-end adapter 126 of the storage system 100.

When the cloud tethering subsystem 158 has an error to report, the guest operating system utility GOSconfig 224 opens a gatekeeper device (LUN) 230 for writing (block 410). The GOSconfig 224 builds a CDB (Command Descriptor Block) for a SCSI write buffer command, with the syscall parameter data as a payload, and stores the CDB in a buffer (block 415). The GOSconfig 224 sends the syscall data over the gatekeeper device 230 to the storage system operating system 150 (block 420).

As noted above, the write to the gatekeeper device 230 will appear on the storage system as a write IO at the storage system FA (front-end adapter) 126 (block 425). When the front-end adapter receives the write IO, the front-end adapter 126 does basic sanity checking (block 430), allocates a scratch slot to the IO, and copies the parameters of the syscall to the scratch slot (block 435). A scratch slot, as that term is used herein, is a cache slot that is being used to hold system data rather than live customer data. Once the parameters of the syscall are written to the scratch slot, the error system write IO is complete (block 440).

FIG. 5 shows operations associated with read back of the post_error message. As shown in FIG. 5, in some embodiments GOSconfig 224 builds a CDB for a SCSI read buffer command (block 500). The IO read is sent to the gatekeeper device (block 505), which is implemented as a read IO on a front-end adapter 126 of the storage system 100 (block 510). When the front-end adapter 126 receives the read IO, the front-end adapter 126 does some basic sanity checking, for example to ensure that the read IO matches the previous write IO (block 515). This is important to serialize the write/read IO operations.

As part of the read IO, the front-end adapter 126 calls into the syscall code 154 of the storage system operating system 150 (block 520). The syscall code 154 reads the post_error parameters from the allocated scratch slot and stores the post_error parameters in a local buffer (block 525). The syscall code 154 does basic sanity checks (block 530) and determines from the parameters that the syscall is associated with logging an error on the storage system (block 535). The syscall code determines the application type, the error severity, and any modifiers (block 540). In the illustrated example, the application type is a cloud tethering subsystem, although other applications may use this mechanism to report errors as well.

The syscall code 154 logs the error on the error system reporting system 155 (block 545) and writes the execution status and any return data to the scratch slot (block 550). The front-end adapter 126 reads the write execution status from the scratch slot (block 555). The front-end adapter 126 signals completion of the read IO to the guest operating system 202 and returns the status of the Post_Error syscall (block 560). At this point the error system read IO is complete, and GOSconfig 224 has received the status of the Post_Error syscall and any return data (block 565). In some embodiments, the result of the Post_Error syscall is provided to cloud tethering subsystem application 158.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for enabling dial home service requests from an application executing in an embedded environment, the computer program including a set of instructions which, when executed by a computer, cause the computer to perform a method comprising the steps of:
   instantiating an application in a container virtualized from a storage system Operating System (OS) by a storage system hypervisor, the container including a guest OS;
   providing a guest OS utility in the guest OS, the guest OS utility being implemented as an Application Programming Interface (API) to the guest OS that is configured to receive application execution errors generated and posted by the application that is executing in the container in the context of the guest OS;
   executing the application in the context of the guest OS;
   generating an application execution error by the application;
   receiving the error by an error reporting subsystem in the container;
   determining a type of error by the error reporting subsystem;
   selecting an application error code for the error by the error reporting subsystem based on the type of error;
   posting the application error code, by the error reporting subsystem to the guest OS utility;
   receiving the application error code, by the guest OS utility;
   in response to receiving the application error code, generating a storage system OS error reporting system call (syscall) containing the application error code, and posting the error reporting syscall, by the guest OS utility to the storage system OS, to enable the guest OS to communicate the application error code to the storage system OS; and in response to receipt of the posted system call, processing the error reporting syscall by the storage system OS and transmitting, by the storage system OS, the application error code to an external error resolution system as a dial-home service request, the external error resolution system executing outside the context of the storage system OS.

2. The non-transitory tangible computer readable storage medium of claim 1, wherein the application is a cloud tethering subsystem containing control logic configured to select snapshots of data volumes and ship the selected snapshots of data volumes to a cloud repository.

3. The non-transitory tangible computer readable storage medium of claim 2, wherein the application has external network interfaces configured to communicate with the cloud repository.

4. The non-transitory tangible computer readable storage medium of claim 2, wherein the application has a Representational State Transfer (REST) API configured to communicate with a storage system management application.

5. The non-transitory tangible computer readable storage medium of claim 1, wherein the guest OS utility is a multi-run API, the method further comprising collecting a first set of application execution errors and errors associated with the container, and posting by the multi-run guest OS utility the first set of application execution errors and the errors associated with the container using one of the system calls.

6. The non-transitory tangible computer readable storage medium of claim 1, wherein the step of posting, by the guest OS utility, the application execution errors and the errors associated with the container as system calls in the storage system OS, comprises:
creating a logical storage volume and installing the logical storage volume in the guest OS;
implementing a write Input/Output (IO) on the logical storage volume by writing a first Small Computer System Interface (SCSI) Command Descriptor Block (CDB) to the logical storage volume by the guest OS utility, and
implementing a read IO on the logical storage volume by reading back a second SCSI CDB from the logical storage volume by the guest OS utility;
wherein the first SCSI CDB contains the system call.

7. The non-transitory tangible computer readable storage medium of claim 6, further comprising receiving the write IO by a front-end adapter and storing the write IO in a scratch slot on the storage system.

8. The non-transitory tangible computer readable storage medium of claim 7, further comprising receiving the read IO by a front-end adapter, reading the system call from the scratch slot, and passing the system call to the storage system OS.

9. The non-transitory tangible computer readable storage medium claim 1, wherein the error reporting subsystem contains a table of errors used by the storage system operating system to classify the application execution errors on the storage system.

10. The non-transitory tangible computer readable storage medium of claim 9, wherein the table of errors includes error codes for all possible dial-home errors used by the storage system OS in connection with communication with the external error resolution system.

11. A method of enabling dial home service requests from an application executing in an embedded environment, the method comprising the steps of:
instantiating an application in a container virtualized from a storage system Operating System (OS) by a storage system hypervisor, the container including a guest OS;
providing a guest OS utility in the guest OS, the guest OS utility being implemented as an Application Programming Interface (API) to the guest OS that is configured to receive application execution errors generated and posted by the application that is executing in the container in the context of the guest OS;
executing the application in the context of the guest OS;
generating an application execution error by the application;
receiving the error by an error reporting subsystem in the container;
determining a type of error by the error reporting subsystem;
selecting an application error code for the error by the error reporting subsystem based on the type of error;
posting the application error code, by the error reporting subsystem to the guest OS utility;
receiving the application error code, by the guest OS utility;
in response to receiving the application error code, generating a storage system OS error reporting system call (syscall) containing the application error code, and posting the error reporting syscall, by the guest OS utility to the storage system OS, to enable the guest OS to communicate the application error code to the storage system OS; and
in response to receipt of the posted system call, processing the error reporting syscall by the storage system OS and transmitting, by the storage system OS, the application error code to an external error resolution system as a dial-home service request, the external error resolution system executing outside the context of the storage system OS.

12. The method of claim 11, wherein the application is a cloud tethering subsystem containing control logic configured to select snapshots of data volumes and ship the selected snapshots of data volumes to a cloud repository.

13. The method of claim 12, wherein the application has external network interfaces configured to communicate with the cloud repository.

14. The method of claim 12, wherein the application has a Representational State Transfer (REST) API configured to communicate with a storage system management application.

15. The method of claim 11, wherein the guest OS utility is a multi-run API, the method further comprising collecting a first set of application execution errors and errors associated with the container, and posting by the multi-run guest OS utility the first set of application execution errors and the errors associated with the container using one of the system calls.

16. The method of claim 11, wherein the step of posting, by the guest OS utility, the application execution errors and the errors associated with the container as system calls in the storage system OS, comprises:
creating a logical storage volume and installing the logical storage volume in the guest OS;
implementing a write Input/Output (IO) on the logical storage volume by writing a first Small Computer System Interface (SCSI) Command Descriptor Block (CDB) to the logical storage volume by the guest OS utility, and implementing a read IO on the logical storage volume by reading back a second SCSI CDB from the logical storage volume by the guest OS utility;

wherein the first SCSI CDB contains the system call.

17. The method of claim 16, further comprising receiving the write IO by a front-end adapter and storing the write IO in a scratch slot on the storage system.

18. The method of claim 17, further comprising receiving the read IO by a front-end adapter, reading the system call from the scratch slot, and passing the system call to the storage system OS.

19. The method of claim 11, wherein the error reporting subsystem contains a table of errors used by the storage system operating system to classify the application execution errors on the storage system.

20. The method of claim 19, wherein the table of errors includes error codes for all possible dial-home errors used by the storage system OS in connection with communication with the external error resolution system.

* * * * *